(12) United States Patent
Parker et al.

(10) Patent No.: US 8,343,394 B2
(45) Date of Patent: Jan. 1, 2013

(54) PYROSPHERELATOR

(75) Inventors: Gerard E. Parker, Eudora, MO (US); Andrew P. Parker, Walnut Grove, MO (US)

(73) Assignee: Gap Engineering LLC, Ash Grove, CA (US)

( * ) Notice: Subject to any disclaimer, the term of this patent is extended or adjusted under 35 U.S.C. 154(b) by 0 days.

(21) Appl. No.: 13/242,375

(22) Filed: Sep. 23, 2011

(65) Prior Publication Data

US 2012/0013032 A1    Jan. 19, 2012

Related U.S. Application Data

(62) Division of application No. 12/244,501, filed on Oct. 2, 2008, now Pat. No. 8,057,203.

(51) Int. Cl.
*B29B 9/00* (2006.01)
(52) U.S. Cl. ......................................................... 264/15
(58) Field of Classification Search ..................... 264/15
See application file for complete search history.

(56) References Cited

U.S. PATENT DOCUMENTS

| | | |
|---|---|---|
| 2,583,452 A | 1/1952 | Watts et al. |
| 2,795,819 A | 6/1957 | Lezberg et al. |
| 3,171,714 A | 3/1965 | Jones et al. |
| 3,272,615 A | 9/1966 | Beeton et al. |
| 3,323,888 A | 6/1967 | Searight et al. |
| 3,617,358 A | 11/1971 | Dittrich |
| 3,640,673 A | 2/1972 | Okamoto et al. |
| 3,649,234 A | 3/1972 | Charpentier |
| 4,238,430 A | 12/1980 | Phillips |
| 4,295,808 A | 10/1981 | Stephan et al. |
| 4,371,328 A | 2/1983 | Giles et al. |
| 4,408,971 A | 10/1983 | Karinsky et al. |
| 4,475,936 A | 10/1984 | Aston et al. |
| 4,900,639 A | 2/1990 | Hodes et al. |
| 5,002,696 A | 3/1991 | White |
| 5,007,181 A | 4/1991 | Jackson et al. |
| 5,136,609 A | 8/1992 | Yamaguchi et al. |
| 5,143,534 A | 9/1992 | Kilner et al. |
| 5,340,781 A | 8/1994 | Oda et al. |
| 5,372,857 A | 12/1994 | Browning |
| 5,384,164 A | 1/1995 | Browning |
| 5,618,475 A | 4/1997 | Johnson et al. |
| 5,763,109 A | 6/1998 | Tabuchi et al. |
| 6,024,915 A | 2/2000 | Kume et al. |
| 6,045,913 A | 4/2000 | Castle |
| 6,814,903 B1 | 11/2004 | Parker |
| 6,939,389 B2 | 9/2005 | Mooney et al. |

(Continued)

OTHER PUBLICATIONS

North American Manufacturing Co., "Gas-Electric Blowtorch and Gas-Compressed Air Torches", Bulletin 4620/4696, (Jul. 2002), 2 pages.

*Primary Examiner* — Mary F Theisen
(74) *Attorney, Agent, or Firm* — Blakely Sokoloff Taylor Zafman LLP

(57) ABSTRACT

Crystalline alumina particles are intimately mixed with a gaseous fuel, air and oxygen. The mixture is then ignited in a torch. Such blending of the powder with the combustible gas allows the alumina particles to be immediately heated to above their melting temperature and allows the particles to form into spheres. The spheres are then rapidly cooled to ambient temperature, providing high purity micron-sized polymorphic alumina spheres without the use of additives or special treatment.

10 Claims, 2 Drawing Sheets

U.S. PATENT DOCUMENTS

| | | | |
|---|---|---|---|
| 7,641,824 B2 * | 1/2010 | Sakaguchi et al. | 264/15 |
| 2002/0066674 A1 | 6/2002 | Nora et al. | |
| 2004/0180991 A1 | 9/2004 | Che et al. | |
| 2004/0224040 A1 | 11/2004 | Furuya | |
| 2006/0165898 A1 | 7/2006 | Kodas et al. | |
| 2006/0275723 A1 | 12/2006 | Che | |
| 2007/0110655 A1 | 5/2007 | Xie et al. | |
| 2008/0044678 A1 | 2/2008 | Hung | |

* cited by examiner

PYROSPHERELATOR

CROSS-REFERENCE TO RELATED APPLICATION

This application is a divisional of co-pending application Ser. No. 12/244,501 filed Oct. 2, 2008.

BACKGROUND OF THE INVENTION

1. Field of the Invention

This invention relates generally to the field of metal matrix composites and, more particularly, to a method and apparatus for manufacturing micron-sized spherical alumina powders with polymorphic structure.

2. Background

Ceramic reinforced aluminum metal matrix composites (ALMMCs) offer unique combinations of properties. They can be engineered to have the stiffness of titanium, better wear resistance than steel and tailorable coefficient of thermal expansion, all while maintaining the lightweight characteristics of aluminum. Thus far, ALMMCs have been used primarily in certain aircraft and automotive components. More widespread use of ALMMCs has been impeded by two problems. One is the high cost associated with the subsequent machining of ALMMC materials with reinforcing particles such as SiC, $B_4C$, $Si_3N_4$, and $Ti_2B$ after the basic material is fabricated. The second problem relates particularly to the use of alumina ($Al_2O_3$) particulates as the reinforcing agent. In this case, a significant problem arises during the installation of conventional $Al_2O_3$ powders in the aluminum alloy matrix of choice, i.e., from any of the 2000 series, 6000 series or 7000 series alloys. All of these matrix alloys contain important quantities of Mg as an alloy-strengthening agent. In order to create the ALMMC it is necessary to heat the material to temperatures well above room temperature. During the elevated temperature processing steps, conventional $Al_2O_3$ powders react with the Mg alloying agent in the matrix to form a spinel like compound. The chemical reaction removes the Mg as an active strengthening agent leading to an ALMMC that exhibits inferior mechanical properties.

It has been found that when micron-sized $Al_2O_3$ alloy powders whose particle shape is spherical and whose crystalline state is at least partially amorphous are incorporated into Al alloy matrices containing Mg as a strengthening agent, the chemical interaction between the reinforcing particles and Mg is fully suppressed, resulting in materials of very high strength. Once fabricated into a wrought product, this ALMMC material machines as easily as un-reinforced alloy material. This permits various engineered products to be made from this material in a very economical manner.

Current methods for manufacturing spherical alumina particles is to employ alloying elements such as magnesium, chromium or titanium, as disclosed in U.S. Pat. No. 6,814, 903, or other elements such as boron, as disclosed in U.S. Pat. No. 5,340,781, to lower the melting point of $Al_2O_3$. Additives of alkali, halogens and alkaline earths and boron compounds greatly reduce the melting temperature of the alumina. These processes involve binding the alloying element with cation bonding in an aquious solution, drying the powder, milling the dried product and then firing to powder to form the spheres. This process is costly and time consuming and results in an impure $Al_2O_3$ final product.

SUMMARY OF INVENTION

The present invention provides a new process for producing high purity polymorphic alumina spheres without additives or special treatment.

The melting point of untreated calcined alumina is $\geq 2000°$ C. In order to produce a sphere, the particle must come to a liquid state, and then be rapidly cooled. The process of the subject invention intimately mixes crystalline $Al_2O_3$ particles with a gaseous fuel, air and oxygen and then initiates combustion of the mixture. Such blending of the powder with the combustible gas allows the particles to be immediately heated to above the melting temperature of calcined alumina. This allows the particles to form into spheres. The spheres are then rapidly cooled to ambient temperature. The rapid cooling retains, at least in part, the amorphous character of the melted $Al_2O_3$ in the spheres.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
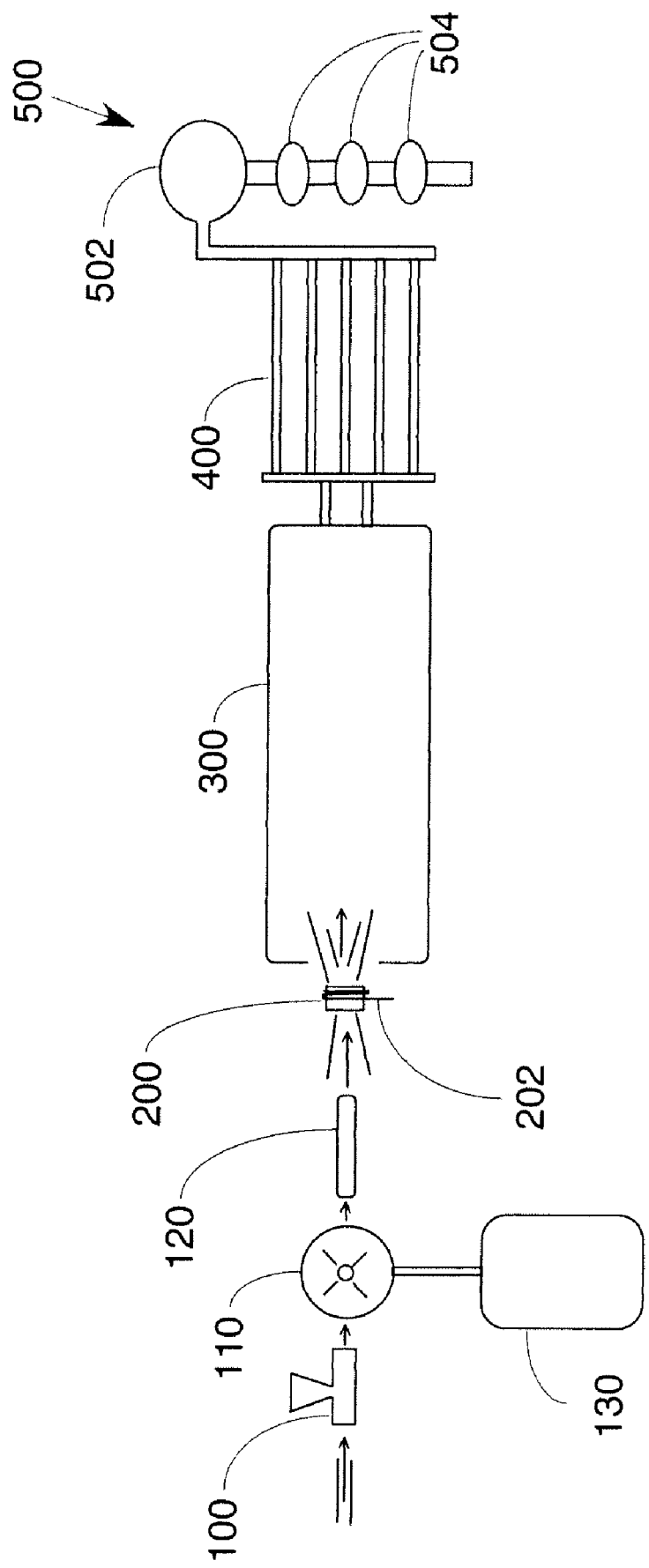
FIG. 1 is a diagrammatic illustration of a pyrospherelator in accordance with an embodiment of the present invention.

FIG. 1 is a schematic diagram of a pyrospherelator 10 in accordance with an embodiment of the present invention. The principal components or sections of the apparatus comprise a feed system 100, a torch 200, chamber 300, radiator 400 and collection system 500.

Figure 2:
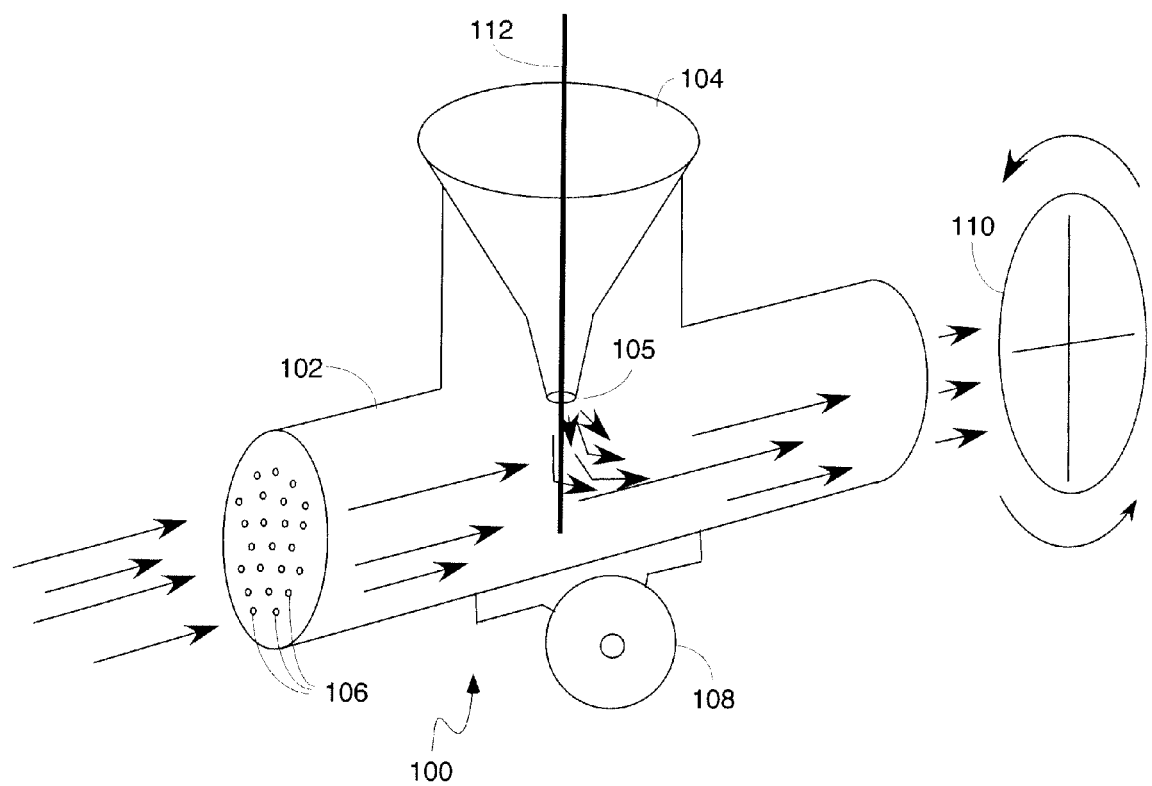
FIG. 2 is a detailed diagrammatic illustration of a pyrospherelator feed system.

Referring also to FIG. 2, the feed system 100 consists of a horizontal tube 102 approximately 12 inches in length and 3 inches in diameter. The feed system controls the rate at which the feed powder is mixed into the combustion air. The powder is fed vertically into the top of the feed tube using a vibrating funnel shaped vessel 104. Combustion air is pulled through the feed tube by the action of the cyclone 110. The combustion air enters the feed tube 102 through a series of small holes 106 to increase the velocity of the combustion air to a rate sufficient to carry the feed particles. The particles are pulled into the combustion air stream by the action of the cyclone. Feed rate is controlled by varying the frequency of vibration and the size of the orifice that the material is fed through. The described embodiment employs feed rates of up to 25 pounds per hour and operates optimally with available alumina powder at a feed rate of about 18 pounds per hour.

The mechanical cyclone 110 is an aluminum housing containing aluminum fan blades spinning at approximately 12,000 rpm. The cyclone creates an air velocity of 2300 feet per minute through the nozzle of the torch. Combustion air containing the feed particles enters the cyclone where the particles are deagglomerated by the spinning blades and intimately mixed with the entering fuel 130, which is propane in the described embodiment. As the fuel, air, and particle mixture leaves the cyclone it is enriched with oxygen gas to enhance combustion. The flow of oxygen gas is controlled by a regulator and is added to the combustion air/fuel mixture at a rate of approximately 200 cubic feet per hour.

Typical alumina powders that are packaged in a pre-ground form exhibit average particle sizes of 4 to 10 microns. Powders of this particle size have a tendency to attract moisture to the surface of the particles. This surface moisture can decrease the powders ability to flow and increase the tendency for the particles to agglomerate. Therefore humidity must be considered when working with the feed powder. The powder will flow through the feed system quite well on its own when the relative humidity is below 40%. At humidity levels between 40% and 70% it is helpful to warm the bulk powder to a temperature of 110 to 130 degrees F. This will drive off the surface moisture and increase the powders ability to flow. At humidity levels above 75% it can be helpful to blend the powder with a very small amount of zinc stearate powder prior to warming. Good results have been achieved with a stearate/feed powder ratio of about 0.2% by weight. The stearate is hydrophobic in nature and deters the surface moisture from forming in the powder. The stearate has a very low melting point around 250° F. and simply vaporizes during the firing process, leaving the alumina unaffected.

If the powder contains enough moisture to cause agglomeration and clumping of the particles it will need to be mechanically deagglomerated after drying. This can be accomplished by several methods of milling. The objective is to mill the powder in such a fashion that the agglomerated particles are broken apart but the ultimate size of the individual particles is not changed. A standard paint shaker designed to shake two one-gallon containers simultaneously may be used. The 3 dimensional movement of the shaker works well to blend the stearate with the alumina as well. Cylindrical shaped milling media made from pressed and fired aluminum oxide measuring ¾ inch diameter and 1 inch long are added with the agglomerated alumina powder at a weight ratio of 2 to 1 powder to media. Typically, for a one-gallon container, this would be 7 pounds of alumina powder and 3.5 pounds of media. The combined powder and media are shaken for 5 minutes, which is sufficient to break up agglomerations and/or fully blend in the stearate.

The feed system 100 is constructed of light gauge sheet metal. This material allows the vibration from the attached vibrator 108 to travel easily throughout the feeder and be transmitted into the powder. When the frequency of the vibrator is adjusted correctly, it has a visible stirring effect on the powder in the funnel section of the feeder. This prevents the powder from settling and packing into the neck of the funnel as it is being drawn into the air stream of combustion air. The pneumatic turbine vibrator 108 has a maximum rpm of 12,000 at 80 psi of air pressure. In a typical setup, the air pressure to the vibrator is set at 10 to 20 psi and a ⅛ inch feed rod is used to produce feed rates of 14 to 18 pounds of alumina per hour. This varies with ambient temperature, relative humidity and particle size and distribution of the feed powder.

The orifice 105 at the end of the funnel is approximately ⅜ inch diameter and the ultimate feed rate of the powder is controlled by selecting a feed rod 112 of such diameter that the desired feed rate is achieved. The feed rods are from approximately 1/16 inch diameter to 3/16 inch diameter and are made from different gauges of copper or aluminum wire.

The cyclone 110, oxygen enrichment tube 120, and nozzle 200 are all parts from a modified model 4620 gas-electric blowtorch manufactured by North American Manufacturing Co. of Cleveland Ohio. The cyclone impellor is approximately 4 inches in diameter and designed to move air from the center of the impellor out in a direction perpendicular to the incoming air. This flow enables the incoming particles contained in the combustion air to come in direct contact with the blades of the impellor, which aids in deagglomerating the alumina particles. Oxygen is added to the combustion air through a ¼ inch hole drilled into the side of the aluminum tube attached to the cyclone housing. Oxygen is fed from a regulated tank through ¼ inch copper tubing at a rate of approximately 200 cubic feet an hour.

The mixture of feed particles, fuel, air and oxygen is ignited at the torch nozzle 200. The nozzle 200 is made of cast iron and has been modified by smoothing and polishing the inner surface to help prevent particles from accumulating in the nozzle tip. The tip of the nozzle is wrapped with ¼ inch copper tubing 202 for cooling. Water is circulated through the tubing at a rate of 2.5 gal/min. Additional cooling is provided by directing a stream of air to the rear of the nozzle tip as well as around the aft section of the nozzle. The nozzle has an inside diameter of 1.25 inches. The nozzle is designed to create backpressure so that ignition remains at the fore tip of the nozzle.

The torch flame containing the feed particles is directed toward cylindrical chamber 300. The chamber is large compared to the flame and is multi-functional. In the described embodiment, the chamber is approximately 12 feet long and 24 inches in diameter. It is constructed of steel and is lined internally with stainless steel.

One function of chamber 300 is to partially shield the flame and capture the particles as they exit the plume of the flame. The torch end of the chamber is sealed with a lid that is designed with a 6 inch diameter flame hole into which the flame is directed. The torch nozzle is placed 2 inches from the flame hole, which leaves approximately 20% of the length of the flame exposed and the remaining length of the flame shielded inside the chamber. This exposed section of the flame allows for visual inspection of the flame and more importantly allows sampling of the particles in the flame.

As the feed powder is being processed in the flame, it can be sampled by attaching a standard glass microscope slide to a suitable handle and passing it through the flame, thus capturing particles directly on the slide for microscopic observation. This sampling can give the operator valuable information for making adjustments to the feed rate, oxygen enrichment and combustion airflow. The slide can be visually examined for agglomerations and overall amount of material retained on the slide. If the operator is careful to pass the slide through the flame at approximately the same rate each time, an immediate opinion can be made as to the feed rate of the alumina material by the amount retained on the slide. These observations can be compared with actual feed rates calculated by simply timing a weighed amount of sample as it flows through the feed funnel. When the feed rate is optimal, the slide will be covered in a light and even layer of material giving the slide a "smoky" appearance. The slide can be examined under a microscope at a magnification of 400× to verify the formation of spherical shaped particles and to estimate the overall particle size and distribution. These slides can be retained and analyzed with X-ray diffraction equipment to verify crystal structure. X-ray diffraction analysis has verified that the particles on the slide sample contain the same polymorph multiphase crystal structure that is exhibited in bulk samples collected from the containment sections of the pyrospherelator. This indicates that a fairly rapid cooling of the spherodized particles contributes to their polymorphic structure and that the cooling that occurs in the chamber of the pyrospherelator is similar to the rapid cooling that occurs when swiping particles directly out of the flame and into ambient temperatures.

A second function of chamber 300 is to provide initial cooling of the flame treated particles. Cool ambient air is pulled into the chamber around the plume through the 6 inch diameter flame hole by a downstream particle vacuum which is connected to the downstream end of the chamber via a tube style radiator system. Air velocity entering the chamber is adjusted to be between 700 and 900 feet per minute in the described embodiment. Air velocity can be maintained by monitoring the pressure of the downstream filter bags.

A third function of chamber 300 is to provide a vessel to contain flame treated particles that settle out of the air current. Generally the smaller particles continue to travel in the generally horizontal air current, through the chamber and on to the downstream filter system. The larger particles tend to settle out of the air current and are contained in the chamber. The described embodiment typically deposits approximately 20% of the flame treated material in the chamber.

Finally, a fourth function of chamber 300 is to provide initial radiant cooling of the generated hot gases. The exterior of the chamber is cooled with several fans blowing ambient air directed at the chamber. Temperatures on the exterior of the chamber range from 300° F. to 425° F. depending on ambient conditions.

Further radiant cooling is accomplished in a tube-style radiator 400. A series of aluminum tubes approximately 4 inches in diameter comprising a total length of 50 to 100 feet is attached between the chamber 300 and the particle vacuum 502. The hot gases generated by the torch are pulled through the chamber and into the radiator system. The aluminum tubes are cooled with fans and radiate the heat of the particle containing air/gas to a safe and collectible level. The described embodiment exhibits air temperatures of 160° F. to 220° F. as it exits the radiator system.

After passing through radiator 400, the particles travel through the particle vacuum 502 and are collected in a series of filter bags 504. As previously mentioned, the pressure in the filter bags is monitored with a manometer gauge. Because system airflow is inversely proportional to filter bag pressure, proper system airflow can be maintained by anticipating when to shake and/or change the filter bags.

X-Ray diffraction analysis of the raw feed material and the "fired" product indicate that the process of the above-described invention has the unique ability to take pure aluminum oxide in its common hexagonal crystal structure (alpha alumina) and transform it into a polymorph. This new polymorph contains a significant amount of gamma alumina, which exists in a cubic crystal form, and a smaller amount of what appears to be the rare form of delta alumina, which is orthorhombic in crystal structure, as well as an amount of the original crystal. All three of these phases exist in a solid solution containing 15% or less of amorphous (glassy) material in each of the microspheres.

Since a glassy state is achieved by essentially quenching the product, it is believed that the exterior shell of each sphere is in a glassy state. Having an outer shell of each alumina particle in a glassy state allows creation of an aluminum metal matrix composite in which the alumina particles do not react chemically and combine with the magnesium alloying element in the basic aluminum metal portion to the detriment of the basic mechanical strength of the metal matrix composite. Thus, the polymorphic alumina spheres produced in accordance with the present invention are particularly well suited for the production of metal matrix composite alloy materials.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of producing substantially spherical polymorphic particulates comprising:
   injecting a crystalline feed material into a torch flame;
   melting the feed material with the torch flame to form molten droplets;
   directing the torch flame into a cooling chamber such that a portion of the flame is exposed outside of the chamber;
   sampling the exposed portion of the flame to collect a sample of particles in the flame;
   examining the sample in order to a feed rate of the feed material;
   cooling the molten droplets to form solid polymorphic particulates;
   collecting the particulates in a filter.

2. The method of claim 1 wherein the feed material comprises alumina powder.

3. The method of claim 2 wherein the alumina powder has an average particle size between 4 and 10 microns.

4. The method of claim 1 wherein the molten droplets are cooled while traveling substantially horizontally.

5. The method of claim 4 wherein substantially horizontal travel of the molten droplets is maintained by airflow.

6. The method of claim 1 wherein the feed material is mixed with fuel before injection into the torch flame.

7. The method of claim 6 wherein the fuel comprises propane.

8. The method of claim 6 wherein the mixture of feed material and fuel is further mixed with oxygen before injection into the torch flame.

9. The method of claim 1 wherein at least part of the cooling of the molten droplets is accomplished in a radiator.

10. The method of claim 1 further comprising mechanical deagglomeration of the feed material before injection into the torch flame.

* * * * *